(12) United States Patent
Bachmaier et al.

(10) Patent No.: US 11,984,792 B2
(45) Date of Patent: May 14, 2024

(54) GEARED MOTOR UNIT

(71) Applicant: Siemens Aktiengesellschaft, Munich (DE)

(72) Inventors: Georg Bachmaier, Munich (DE); Marco Cyriacks, Munich (DE); Iason Vittorias, Munich (DE); Wolfgang Zöls, München-Lochhausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 504 days.

(21) Appl. No.: 16/628,550

(22) PCT Filed: May 16, 2018

(86) PCT No.: PCT/EP2018/062679
§ 371 (c)(1),
(2) Date: Jan. 3, 2020

(87) PCT Pub. No.: WO2019/007581
PCT Pub. Date: Jan. 10, 2019

(65) Prior Publication Data
US 2020/0220429 A1 Jul. 9, 2020

(30) Foreign Application Priority Data
Jul. 6, 2017 (DE) ...................... 10 2017 211 540.8

(51) Int. Cl.
*F16H 49/00* (2006.01)
*H02K 7/116* (2006.01)
(Continued)

(52) U.S. Cl.
CPC ........... *H02K 7/116* (2013.01); *F16H 49/001* (2013.01); *B60K 2007/0092* (2013.01);
(Continued)

(58) Field of Classification Search
CPC ......... H02K 7/116; F16H 49/001; F16H 1/32; F16H 2049/003; F16H 2057/02034; B60K 2007/0092
See application file for complete search history.

(56) References Cited

U.S. PATENT DOCUMENTS

| 4,577,127 A | 3/1986 | Ferree et al. .................... 310/83 |
| 5,237,230 A * | 8/1993 | Sugiyama ............ H02K 19/103 290/46 |

(Continued)

FOREIGN PATENT DOCUMENTS

| DE | 112014001512 T5 | 1/2016 | ............... F16H 1/32 |
| DE | 10 2015 203 534 A1 | 9/2016 | ............... F16H 1/32 |

(Continued)

OTHER PUBLICATIONS

German Office Action, Application No. 10 2017 211 540.8, 6 pages, dated Mar. 14, 2018.
(Continued)

*Primary Examiner* — Sherry L Estremsky
(74) *Attorney, Agent, or Firm* — Slayden Grubert Beard PLLC

(57) ABSTRACT

Various embodiments include a geared motor unit comprising: a motor with a stator and a rotor; and a gearbox including a first element, a second element, and a third element. The stator is connected to the third element and the rotor is connected to the first element. At least one element of the gearbox is connected to a mass.

8 Claims, 3 Drawing Sheets

(51) Int. Cl.
*B60K 7/00* (2006.01)
*F16H 1/32* (2006.01)
*F16H 57/02* (2012.01)

(52) U.S. Cl.
CPC .......... *F16H 1/32* (2013.01); *F16H 2049/003* (2013.01); *F16H 2057/02034* (2013.01)

(56) References Cited

U.S. PATENT DOCUMENTS

| | | | | |
|---|---|---|---|---|
| 5,497,041 | A * | 3/1996 | Kondoh | H02K 3/26 310/82 |
| 7,530,912 | B2 * | 5/2009 | Kramer | H02K 7/116 475/5 |
| 10,236,747 | B2 * | 3/2019 | Terashima | H02K 5/203 |
| 10,337,561 | B2 * | 7/2019 | Jackowski | B25J 19/06 |
| 2001/0052735 | A1 | 12/2001 | Sakamoto | 310/75 R |
| 2012/0204674 | A1 * | 8/2012 | Lundberg | F16H 49/001 74/640 |
| 2012/0313461 | A1 | 12/2012 | Takeuchi | 310/43 |
| 2017/0051817 | A1 | 2/2017 | Maruyama | 74/640 |
| 2017/0237315 | A1 | 8/2017 | Hirokawa et al. | |
| 2018/0215050 | A1 | 8/2018 | Kassow | |
| 2019/0036419 | A1 * | 1/2019 | Ayuzawa | B25J 17/0258 |

FOREIGN PATENT DOCUMENTS

| | | | | |
|---|---|---|---|---|
| DE | 10 2015 204 420 A1 | | 9/2016 | ............ F16C 27/04 |
| EP | 3 206 285 A1 | | 8/2017 | ............ F16C 33/00 |
| EP | 3351826 A1 | * | 7/2018 | ............ F16H 1/2863 |
| JP | S61-74936 A | | 4/1986 | ............... F16H 1/32 |
| SU | 1714246 A1 | * | 2/1992 | ........... F16H 49/001 |
| WO | 2004/040737 A1 | | 5/2004 | ............ F16H 49/00 |
| WO | WO-2004040737 A1 | * | 5/2004 | ............ F16H 49/001 |
| WO | WO-2007082954 A1 | * | 7/2007 | ............ B25J 9/1025 |
| WO | 2017/012626 A1 | | 1/2017 | .............. B25J 17/02 |
| WO | 2019/007581 A1 | | 1/2019 | ............. H02K 7/116 |

OTHER PUBLICATIONS

International Search Report and Written Opinion, Application No. PCT/EP2018/062679, 18 pages, dated Aug. 31, 2018.
European Notice of Allowance, Application No. 18727201.8, 22 pages, dated May 19, 2023.

* cited by examiner

GEARED MOTOR UNIT

CROSS-REFERENCE TO RELATED APPLICATIONS

This application is a U.S. National Stage Application of International Application No. PCT/EP2018/062679 filed May 16, 2018, which designates the United States of America, and claims priority to DE Application No. 10 2017 211 540.8 filed Jul. 6, 2017, the contents of which are hereby incorporated by reference in their entirety.

TECHNICAL FIELD

The present disclosure relates to motors. Various embodiments include geared motor units. Some embodiments may be used in drive technology and robot technology as well as the fields of application of said sectors.

BACKGROUND

Electromagnetic drives are referred to as electric motors. Said electromagnetic drives usually have a high rotating speed with several thousand revolutions per minute, but often have an inadequate torque. Consequently, gearboxes are used in order for the torque to be increased. Gearboxes are also referred to as forming elements which can vary dissimilar kinetic quantities. Said gearboxes transmit and convert, for example, the kinetic quantities of torques, rotation directions, and rotating speeds.

For example, harmonic drive gearboxes are known which are part of the group of wave gearboxes. The elliptic wave generator as the driven part by way of the ball bearing deforms the flex spline which in the opposite regions of the major elliptic axis engages with the internally toothed circular spline. As the wave generator rotates, the major elliptic axis and thus the tooth meshing region are repositioned. Since the flex spline has fewer teeth than the circular spline, a relative movement by one tooth between the flex spline and the circular spline is performed during half a revolution of the wave generator, and by two teeth during an entire revolution. In the case of a fixed circular spline, the flex spline as the output element rotates counter to the drive.

However, the increased installation space required may be disadvantageous in the use of a gearbox or the combination of a motor and a corresponding gearbox. In other words, the gearboxes by virtue of the installation space or of the required space are unsuitable or even useless for specific applications.

SUMMARY

The teachings of the present disclosure may provide a geared motor unit which is configured in a space-saving and compact manner, and the integrated gearbox furthermore enables an efficient transmission. For example, some embodiments include a geared motor unit (1), having:
a) a motor (12, 14) having a stator (12) and a rotor (14),
b) a gearbox (22, 24, 26) having a first element (22), a second element (24), and a third element (26), wherein
c) one element of the motor (12, 14) is connected to the third element (26), the other element of the motor (12, 14) is connected to the first element of the gearbox (22), and
d) one element of the gearbox (22, 24, 26) is connected to a mass (40).

In some embodiments, the motor (12, 14) is integrated in the gearbox (22, 24, 26).

In some embodiments, the rotor (14) is connected to the third element (26), the stator (12) is connected to the first element of the gearbox (22, 24, 26), and the first element of the gearbox (22) is connected to the mass (40).

In some embodiments, the stator (12) is connected to the first element of the gearbox (22) by way of a stator housing (13).

In some embodiments, the stator (12) is connected to the third element (26), the rotor (14) is connected to the first element of the gearbox (22), and the third element of the gearbox (26) is connected to the mass (40).

In some embodiments, the rotor (14) is connected to the first element of the gearbox (22) by way of a rotor housing (15).

In some embodiments, the geared motor unit (1) or at least one element of the geared motor unit (1) is disposed in a housing (16).

In some embodiments, the stator housing (13) comprises a material which is thermally conductive.

In some embodiments, at least one element of the geared motor unit (12, 14, 22, 24, 26) has at least one hole for routing at least one cable.

In some embodiments, there is an elliptic roller bearing (30) for deforming the first element of the gearbox (22).

In some embodiments, the first element (22) and the second element of the motor (24) have in each case one toothing for establishing a common form-fit.

BRIEF DESCRIPTION OF THE DRAWINGS

Various embodiments of the teachings herein are described in the detailed description hereunder with reference to the following figures in which.

DETAILED DESCRIPTION

Figure 1:
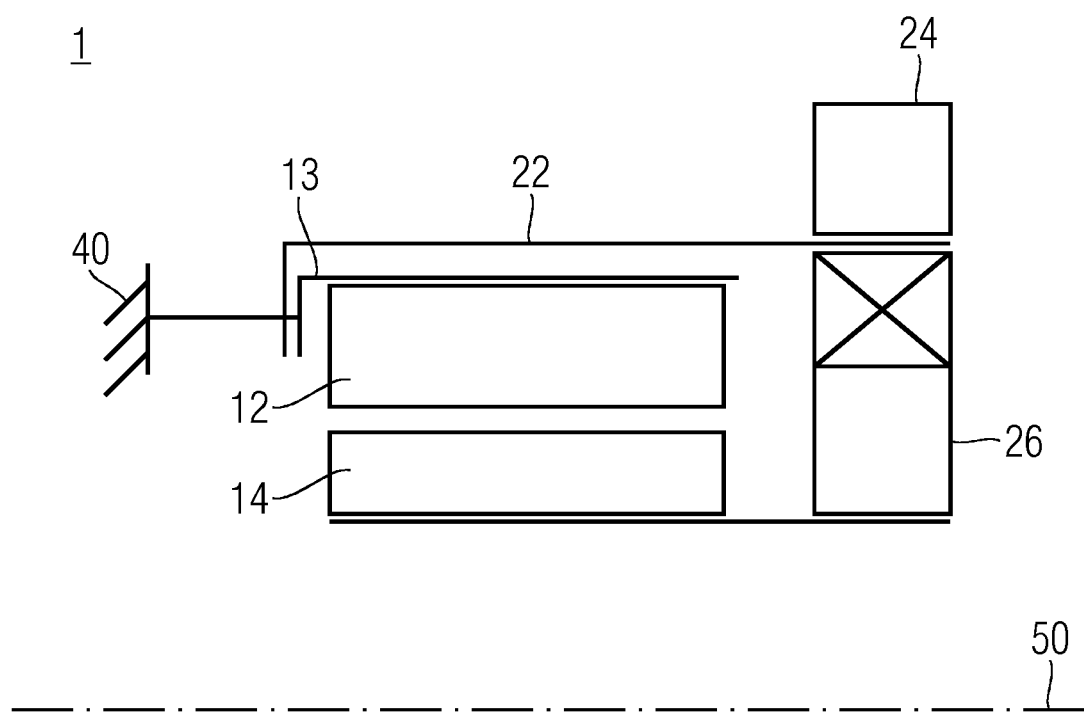
FIG. 1 shows a detailed view of a geared motor unit incorporating teachings of the present disclosure.

Some embodiments include a geared motor unit having:
a) a motor having a stator and a rotor,
b) a gearbox having a first element, a second element, and a third element, wherein
c), one element of the motor is connected to the third element, the other element of the motor is connected to the first element of the gearbox, and
d) one element of the gearbox is connected to a mass.

Accordingly, the geared motor unit may include an assembly or a combination of one motor and one gearbox. In some embodiments, the gearbox comprises a wave gearbox and has three different elements, a flex spline, a circular spline, and a wave generator. The wave generator and the circular spline herein can in each case be used as a drive input or drive output. In other words, in the case of a wave gearbox, the drive input, the drive output, and the mass can be interchanged in an arbitrary manner.

The flex spline is usually able to deform, for example by means of a roller bearing. The deformation of the flex spline herein has to be ensured over a comparatively long service life, and an excessive angular deformation has to be prevented. A sufficient axial construction length of the flex spline is required to this end.

Consequently, a lot of room or installation space is required on account of the construction length. However, the installation space remains unutilized in the prior art.

Furthermore, the elements of the motor and of the gearbox can be disposed, combined with one another, and connected to one another in various ways. Accordingly, the stator and the rotor of the motor can in each case be connected to one element of the gearbox. The rotor can be disposed above or below the stator, etc. The same applies to the elements of the gearbox. The construction mode or the design embodiment of the elements can also be configured in an arbitrary manner.

The motor is integrated in this installation space of the gearbox that is usually not utilized or is vacant. On account thereof, the geared motor unit is very compact and space-saving, as opposed to the prior art. Consequently, the geared motor unit can also be used for all kinds of applications. In some embodiments, the motor is integrated in the gearbox. Accordingly, the geared motor unit is compact and space-saving.

In some embodiments, the rotor is connected to the third element, the stator is connected to the first element of the gearbox, and the first element of the gearbox is connected to the mass.

In some embodiments, the stator is connected to the first element of the gearbox by way of a stator housing. Accordingly, the rotor is connected to the wave generator, for example, and the stator is connected to the flex spline. The flex spline is furthermore connected to the mass.

In some embodiments, the stator is connected to the third element, the rotor is connected to the first element of the gearbox, and the third element of the gearbox is connected to the mass.

In some embodiments, the rotor is connected to the first element of the gearbox by way of a rotor housing. Accordingly, the stator is connected to the wave generator, for example, and the rotor is connected to the flex spline. The wave generator is furthermore connected to the mass. The connection can be established by way of a housing or any other element.

In some embodiments, the geared motor unit or at least one element of the geared motor unit is disposed in a housing. Accordingly, the geared motor unit is at least in part surrounded by a housing. The compact construction is further enhanced on account thereof.

In some embodiments, the stator housing comprises a material which is thermally conductive. Accordingly, a material which guarantees a positive thermal conductivity is used, such as aluminum, for example. On account thereof, the waste heat of the drive input can be discharged from the motor/gearbox unit in a simple and efficient manner without requiring further components, despite the encapsulation.

In some embodiments, at least one element of the geared motor unit has at least one hole for routing at least one cable. Accordingly, a hole or a bore is inserted in one or a plurality of elements of the geared motor unit. On account thereof, cables which are required for actuating the motor, for example, can be routed or installed. In some embodiments, screws or other elements can also be used for screw-fitting the elements.

In some embodiments, the geared motor unit furthermore has an elliptic roller bearing for deforming the first element of the gearbox.

In some embodiments, the first element and the second element of the motor have in each case one toothing for establishing a common form-jet. Accordingly, the gearbox can be configured as a wave gearbox and have further corresponding elements such as roller bearings and toothings of the flex spline and of the circular spline. In some embodiments, any vacant installation space of any other gearbox or gearbox type can be used in order for a motor be integrated in said installation space. On account thereof, the geared motor unit may be combined in an arbitrary manner and capable of being flexibly used in a multiplicity of applications.

FIG. 1 shows a geared motor unit 1 incorporating teachings of the present disclosure, said geared motor unit 1 being mounted about a central shaft 50. The geared motor unit 1 has two components or assemblies 12, 14, 22, 24, 26, specifically a motor 12, 14 and a gearbox 22, 24, 26. The motor 12, 14 according to FIG. 1 is composed of a stator 12 and a rotor 14. The gearbox 22, 24 is furthermore a wave gearbox, for example, which has the usual components of a flex spline 22, of a circular spline 24, and of a wave generator 26.

The rotor 14 according to FIG. 1 is connected to the wave generator 26. The stator 12 is connected to the flex spline 22 by way of a stator housing 13, said flex spline 22 being connected to a mechanical mass 40. Consequently, the rotor 14 and the wave generator 26 rotate. A material which has an ideally positive temperature conductivity is used as the material for the stator housing 13 and/or other elements. The temperature conductivity is required in order to be able to discharge the waste heat of the friction from the closed space of the geared motor unit 1.

Furthermore, holes or bores are used in the flex spline 22, the stator housing 13, and/or other elements. The holes are required for installing cables emanating from the closed space. Screws are dispensed with herein. In some embodiments, screws or any other elements can also be used. For example, holes in the flex spline can be used for screw-fitting or for cables.

Figure 2:
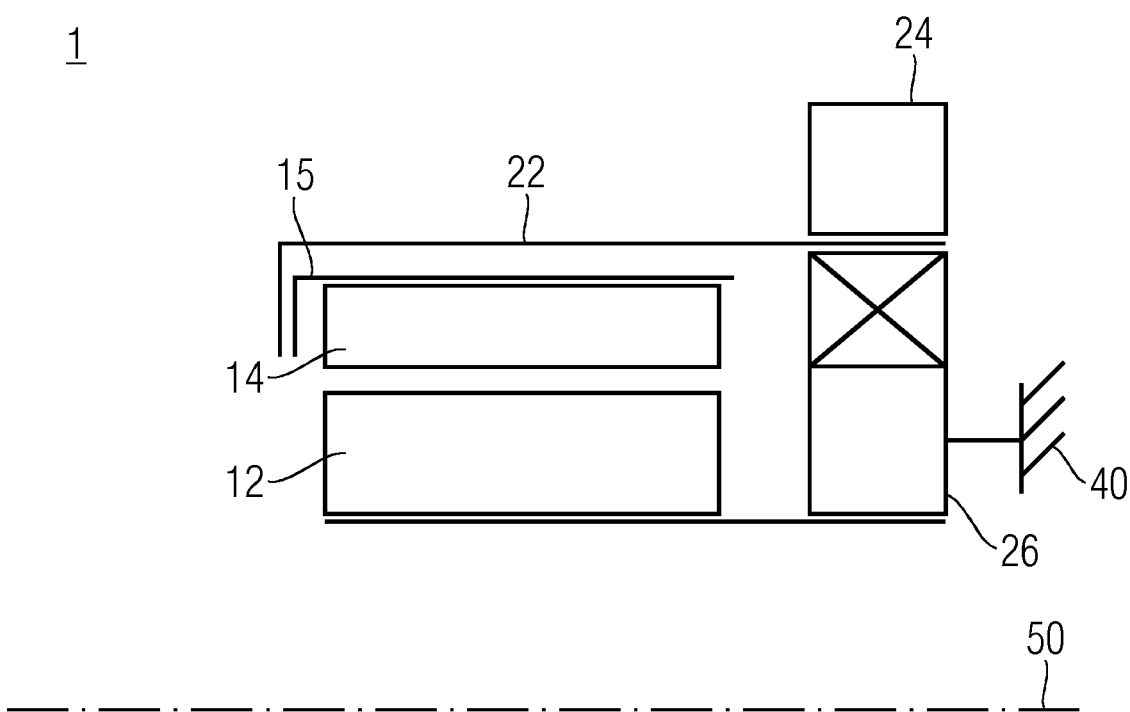
FIG. 2 shows a detailed view of a geared motor unit incorporating teachings of the present disclosure.

FIG. 2 shows a geared motor unit 1 incorporating teachings of the present disclosure. In FIG. 2, the stator 12 and the rotor 14 have been swapped. In other words, the rotor 14 is disposed above the stator 12. The rotor 14 according to FIG. 2 is connected to the flex spline 22 by way of a rotor housing 15. The stator 12 without a stator housing 13 is connected to the wave generator 26. In FIG. 2, it is not the flex spline 22 but the wave generator 26 that is connected to the mass 40. Consequently, the rotor 14 and the flex spline 22 rotate. The gearing ratios according to FIGS. 1 and 2 are identical; only the arrangements of the elements 12, 14 differ from one another.

Figure 3:
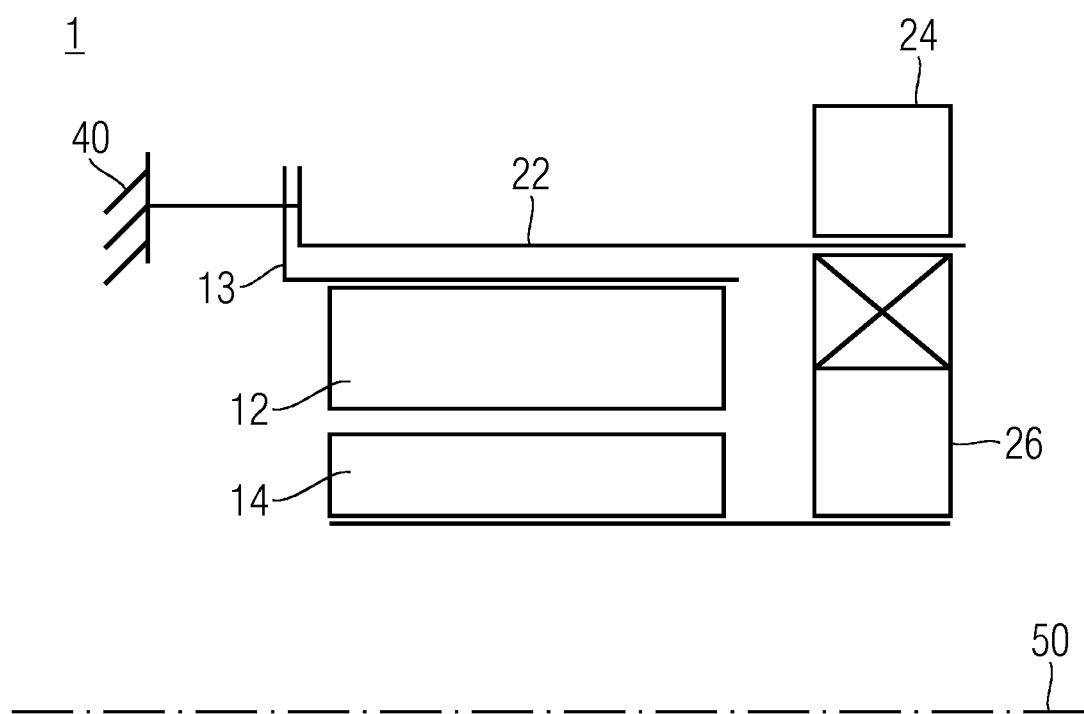
FIG. 3 shows a detailed view of a geared motor unit incorporating teachings of the present disclosure.

The flex spline 22 in FIG. 3 has another construction mode as compared to FIGS. 1 and 2. This construction mode simplifies the installation of the cables and utilizes all screw-fitment bores of the flex spline 22. On account thereof, compromises in terms of strength in the fastening may be prevented. This can be relevant when transmitting the maximum torque. The arrangements or construction modes of the elements 12, 14, 22, 24, 26, 30, 40 can be adapted in an arbitrary manner to the applications of the user. Furthermore, the geared motor unit 1, or elements of the geared motor unit, can be integrated as a closed space in a housing 16.

What is claimed is:

1. A geared motor unit comprising:
    a motor with a stator and a rotor;
    a gearbox including a wave generator, a flex spline, and a circular spline;
    wherein the motor is integrated in the gearbox;
    wherein the wave generator is fixed to the stator and the flex spline rotates with the rotor; and a mechanical mass separate from the stator and fixed to the wave generator.

2. The geared motor unit as claimed in claim 1, wherein the stator is connected to the wave generator with a stator housing.

3. The geared motor unit as claimed in claim 1, wherein the rotor is connected to the flex spline with a rotor housing.

4. The geared motor unit as claimed in claim 1, wherein at least one element of the geared motor unit is disposed in a housing.

5. The geared motor unit as claimed in claim 1, further comprising a thermally conductive housing for the stator.

6. The geared motor unit as claimed in claim 1, wherein at least one element of the geared motor unit defines a hole for routing a cable.

7. The geared motor unit as claimed in claim 1, furthermore comprising an elliptic roller bearing for deforming at least one element of the gearbox.

8. The geared motor unit as claimed in claim 1, wherein the flex spline and the circular spline each include a respective toothing for establishing a common form-fit.

* * * * *